Feb. 25, 1947.  W. S. RENIER  2,416,349
MOLDING MACHINE FOR PLASTICS AND OTHER MOLDABLE MATERIALS
Filed Jan. 14, 1944  2 Sheets-Sheet 1
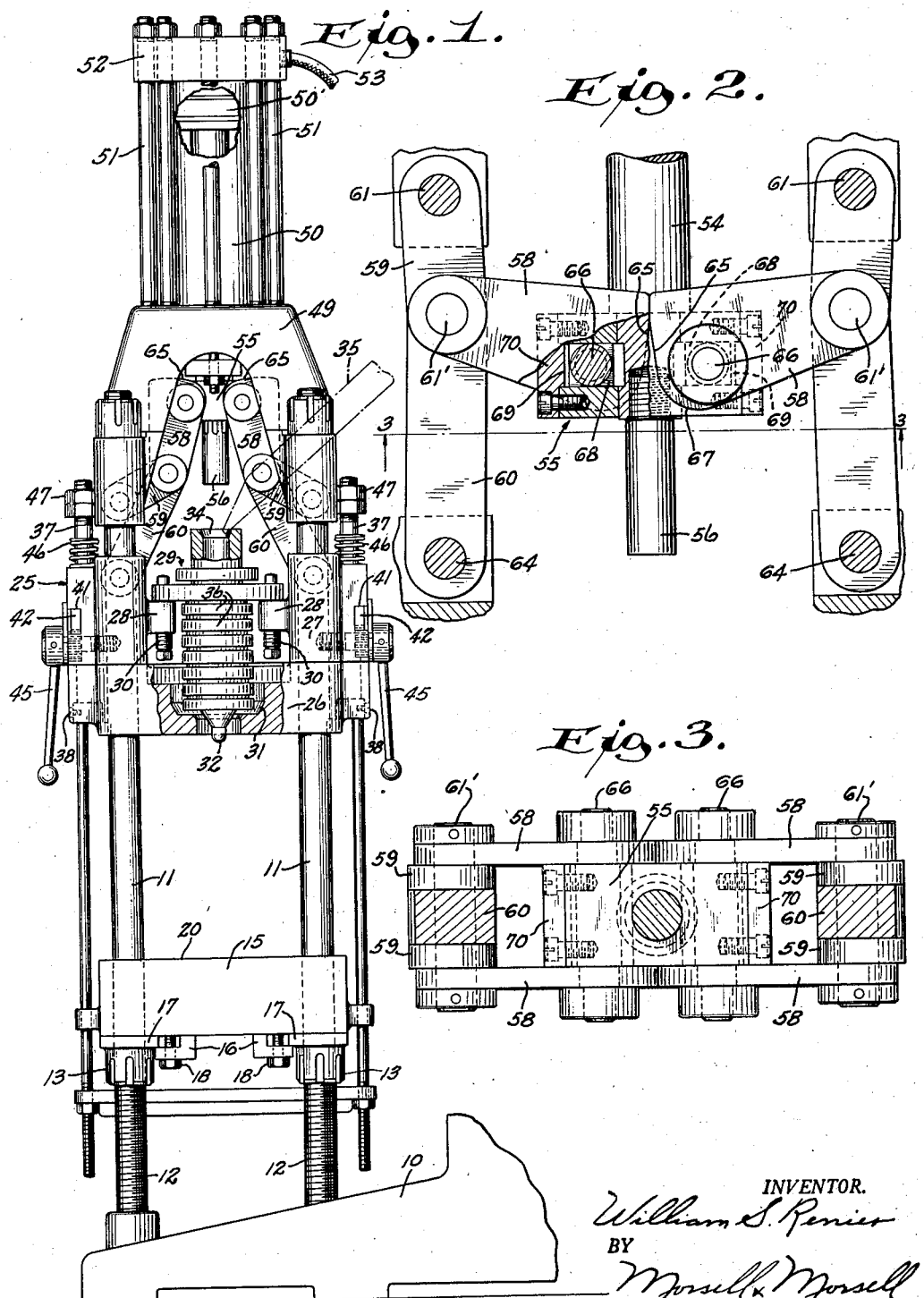
INVENTOR.
William S. Renier
BY
Morsell & Morsell
ATTORNEYS.

Feb. 25, 1947.   W. S. RENIER   2,416,349
MOLDING MACHINE FOR PLASTICS AND OTHER MOLDABLE MATERIALS
Filed Jan. 14, 1944   2 Sheets-Sheet 2

INVENTOR.
William S. Renier
BY
Morsell & Morsell
ATTORNEYS.

Patented Feb. 25, 1947

2,416,349

UNITED STATES PATENT OFFICE 2,416,349

MOLDING MACHINE FOR PLASTICS AND OTHER MOLDABLE MATERIALS

William S. Renier, Milwaukee, Wis.

Application January 14, 1944, Serial No. 518,228

12 Claims. (Cl. 18—30)

This invention relates to improvements in molding machines for plastics and other moldable materials.

While the present invention is particularly adapted for use in the injection molding of thermoplastic materials, nevertheless, features of the invention are applicable to molding machines for handling plastics of a thermosetting type, and to machines for the die casting of alloys.

The majority of successful injection molding machines now in use are horizontally disposed, that is, the movable die plate and injection plunger travel in a horizontal direction. This has been considered necessary because these devices usually employ two hydraulic cylinders—one at one end to open and close the dies, and the other at the opposite end and working in an opposing direction to operate the injection plunger. If these machines were constructed for use in a vertical position, too much head room would be required. Vertical machines, on the other hand, are very desirable not only because they conserve floor space but also because inserts are readily maintained in position on the lower die plate by gravity, whereas in horizontal machines the holding of inserts in proper position on the dies presents a problem.

It is a general object of the present invention to provide a simple, efficient and relatively inexpensive molding machine which may be constructed for use in a vertical position without requiring an excessive amount of head room and which is an improvement upon my application Serial No. 510,864 filed November 19, 1943.

A further and important object of the invention is to provide a molding machine wherein the parts are constructed and arranged in a novel manner to permit a single hydraulic cylinder to effect not only the die opening and closing movement but also the movement of the injection plunger, the parts being so arranged that the movable die plate and injection plunger travel simultaneously in the same direction at a variable rate of speed with respect to each other, and there being improved means for creating a final die closing pressure.

A further object of the invention is to provide in a single cylinder operated molding machine an improved toggle arrangement for transmitting movement from the hydraulic cylinder rod to the movable die plate, said arrangement providing for a varying rate of travel between the movable die plate and an injection plunger carried by said cylinder rod, and there being means incorporated in said toggle arrangement for building up and maintaining a full die-closing pressure during the latter part of the stroke and while the injection plunger is continuing its travel at a relatively high rate of speed to inject the material into the die cavity. In my prior application, heretofore referred to, springs are incorporated in the stationary die plate to permit a slight amount of movement of the mold carrying portion of the stationary die plate after the dies have been completely closed, said construction making use of the springs to maintain the necessary die closing pressure during the latter part of the stroke. In the present invention these springs are eliminated and the stationary die plate is immovable. However, a novel combination of cams in conjunction with a special toggle link arrangement is utilized to build up and maintain the die closing pressure after the die halves have contacted each other.

With the above and other objects in view the invention consists of the improved molding machine and all its parts and combinations as set forth in the claims and all equivalents thereof.

In the accompanying drawings illustrating one complete embodiment of the preferred form of the invention in which the same reference numerals designate the same parts in all of the views:

Fig. 1 is a front elevational view of the improved machine, parts being broken away and shown in section, and the feed chute being indicated by dot-and-dash lines;

Fig. 2 is a fragmentary vertical sectional view, parts being broken away, illustrating the arrangement of the toggle links and cams at the end of the stroke;

Fig. 3 is a sectional view taken on line 3—3 of Fig. 2;

Figure 4:
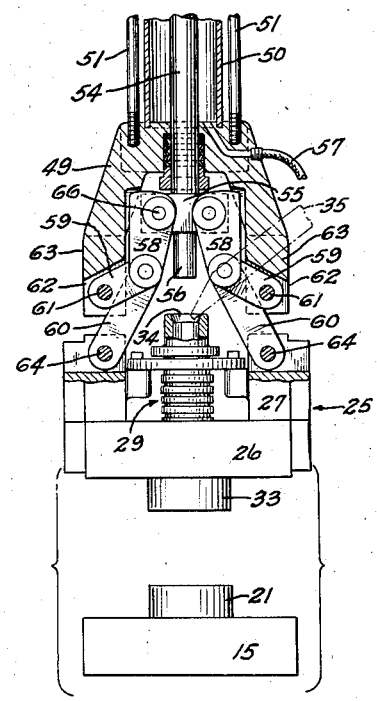
Fig. 4 is a partially diagrammatic view showing a partial vertical section and illustrating the position of the parts when the die is fully open.

Referring more particularly to the drawings the numeral 10 designates a suitable base and said base supports a plurality of upright rods 11, preferably four in number. The lower portion of each rod is threaded as at 12 to receive a nut 13. The nuts 13 may be adjusted to a desired position on the threads 12 and serve to support a stationary die plate 15, it being understood that the machine support rods 11 extend through bores in the stationary die plate. Angle members 16 which engage beneath shoulders 17 on the nuts 13 have bolts 18 extending therethrough and threaded into the die plate 15 to rigidly anchor said die plate to the supporting nuts 13.

The upper surface 20 of the stationary die plate is adapted to support the lower half 21 of a mold.

Slidably mounted on the machine support rods 11 above the stationary die plate 15 is a movable die plate 25 formed of a lower half 26 and an upper half 27. The upper half has inwardly projecting lugs 28 or other suitable means for supporting a heating cylinder 29, the cylinder being removably supported on the upper ends of bolts 30. The lower half 26 of the movable die plate is formed with a vertical opening 31 of such shape as to accommodate the lower portion of the heating cylinder assembly, the nozzle 32 projecting a short distance below the lower face of the movable die plate portion 26. Thus, the nozzle is positioned to enter a short distance into the cavity of the upper half 33 (see Fig. 4) of a mold which is supported on the lower face of the movable die plate.

The heating cylinder has a feed cylinder opening 34 at its upper end into which plastic material in suitable form may be directed by a feed chute 35, the latter being automatically movable in any suitable manner into and out of feeding position during operation of the machine. From the feed cylinder opening the material is directed downwardly into the usual plasticizing cylinder portion where it is heated by heat generated in heating bands 36 surrounding the heating cylinder. The plasticized material is ultimately forced into and out of the nozzle 32 and into the die cavity.

Referring more particularly to Fig. 1, there are rods 37 which have their lower ends anchored as at 38 to the lower half 26 of the movable plate. These rods project upwardly through the upper half 27, and the latter is vertically movable thereon. Each of the rods 37 is formed with a latching recess and when the two halves of the die plate are together as in Fig. 1 the latching recesses register with transverse channels 41. Movable in each channel is a latch member of sliding lock 42. As fully set forth in my copending application Serial No. 510,864, filed November 19, 1943, manipulation of the handle 45 in one direction will cause withdrawal of the sliding lock 42 from the latching recess. This will permit the lower half 26 of the die plate to fall by gravity away from the other half and this fall will be cushioned by coil springs 46 which are engageable with adjustable stop nuts 47. When the two halves of the die plate are thus separated, access may be had to the vertical opening in the lower half of the die plate to facilitate the pushing out of a sprue when this is necessary. The separation of the two halves of the movable die plate also affords ready access to the heating cylinder for repairs or adjustment. When the handle 45 is moved in the reverse direction the sliding lock 42 is moved into engaging position.

The upper ends of the machine support rods 11 suitably support a base 49 for an hydraulic cylinder 50. Bolts 51 projecting upwardly from the base and surrounding the cylinder 50 connect with the cylinder head 52. Hydraulic fluid under pressure is adapted to enter the upper end of the cylinder through an inlet conduit 53 to act on a suitable piston 50' within the cylinder and cause downward movement of the cylinder rod 54 (see Fig. 4). The downwardly projecting end of the cylinder rod is equipped with a toggle link head 55, and below that with an injection plunger 56 which is movable into and out of the opening 34 of the heating cylinder unit during operation of the machine. Reverse movement of the hydraulic cylinder rod 54 is brought about by reversing the flow of the hydraulic fluid so that fluid under pressure is pumped into the lower end of the cylinder 50 through the hydraulic conduit 57.

Pivotally connected to the toggle link head 55 are the inner ends of connecting links 58. The outer ends of the links 58 are pivotally connected to links 59 and to links 60. The links 59 are in turn pivotally connected as at 61 within slots 62 to arms 63 projecting downwardly from the base 49 of the hydraulic cylinder. The lower ends of the links 60 are pivotally connected as at 64 to the upper portion of the upper half 27 of the movable die plate 25.

An important feature of the present invention resides in the formation of the connecting links 58 with cooperating cam shaped ends 65 (see Fig. 2) having cam curvatures 67 at their lower corners. Pivot pins 66 project from bearing blocks 68 and the latter blocks are rectangular in cross section and are laterally slidable in slots 69 formed in the toggle link head 55 as is clear from Figs. 2 and 3. The outer ends of the slots 69 are closed by removable plates 70. It is this cam link construction, in the combination, which makes it possible, in a simple and efficient manner, to build up and maintain the necessary die closing pressure at the end of the stroke as will be hereinafter pointed out.

Figure 5:
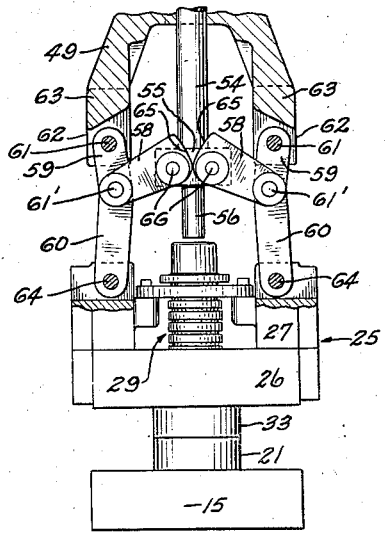
Fig. 5 is a similar view showing the position of the parts when the movable die has just contacted the stationary die.

During operation of the machine, and referring first to Fig. 4, just prior to the start of the downward stroke, the feed chute 35 is in the position of Fig. 4 and automatically delivers a quantity of plastic material into the opening 34 of the heating cylinder. As the hydraulic cylinder rod 54 starts downwardly, the feed chute 35 is automatically swung to an out of the way position so as not to interfere with the ultimate entrance of the plunger 56 into the heating cylinder. When the dies are wide open, as in Fig. 4, the toggle links are in their collapsed position. As the hydraulic cylinder rod 54 moves in a downward direction the toggle links multiply the force exerted by the hydraulic cylinder and cause movement of the movable die plate toward the die closed position. As the parts move from the position of Fig. 4 to an intermediate position, the rate of movement of the hydraulic cylinder rod and the movable die plate is approximately the same. As the movable die plate approaches the die closed position the rate of travel of the hydraulic cylinder rod and injection plunger 56 is much greater than the rate of travel of the movable die plate. This differential in rate of travel becomes so great that during the last part of the die closing stroke the movable die plate movement is very small. When the two halves of the die have just contacted as in Fig. 5, the parts are in the position of said figure. When in this position, however, the hydraulic cylinder rod has not yet completed its stroke, whereas due to the toggle arrangement the dies are in contacting position. When in this position the cam surfaces 67 of the links 58 are just beginning to contact. Continued movement of the piston rod 54 causes the engaging cams to act on the links 59 and 60 in such a manner as to cause a constantly increasing die-closing pressure to be built up. During the movement of the parts from the position of Fig. 5 to the position of Fig. 6, the cam shaped ends 65 roll against each other toward the final position of Fig. 6 and exert an outward pressure in both directions so as to straighten the toggle links 59 and 60, to a slight extent, from the position of Fig. 5 to the position of Fig. 6. This causes the building up and maintaining of the final die closing pressure. The building up of the pressure is preferably accomplished by the rounded lower portions 67 of the cam shaped ends, and it is preferred to have the upper portions (referring to Fig. 2) in the form of relatively flat arcs which are concentric with the pins 61' to maintain the final pressure while the injection plunger is finishing its stroke. While the above described action is taking place, the injection plunger 56 has been continuing its movement at a relatively high rate of speed and has moved from the position of Fig. 5 to the fully inserted position of Fig. 6 to inject the material into the die cavity.

Figure 6:
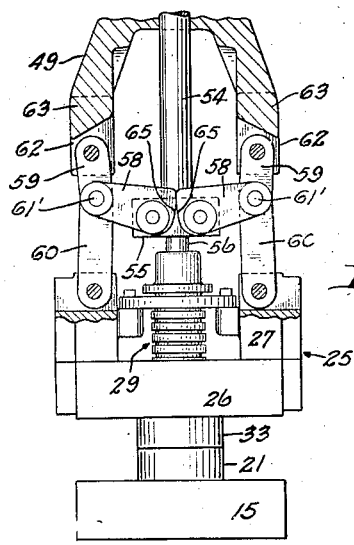
Fig. 6 is a similar view showing the position of the parts while full die closing pressure is being exerted and when the injection plunger is fully inserted in the feed cylinder.

Upon the return stroke of the hydraulic plunger a reverse action takes place and the parts are ultimately returned from the position of Fig. 6 back to the position of Fig. 4. It is to be understood that the plastic material which has been inserted in the upper end of the heating cylinder is gradually forced downwardly from the upper feed cylinder portion to the heated section where the heat causes the powdered material to become plastic. The action of the injection plunger 56 causes the newly receives plastic material in powdered, granular, or pellet form to progress downwardly and at the same time causes discharge from the nozzle 32 into the die cavity of plastic material at the lower end which has been plasticized. It is to be understood that the machine may include suitable means for cooling the mold and for knocking out the molded article.

While the particular construction above described, wherein only a single hydraulic cylinder is utilized, makes it possible to build a vertical machine as illustrated, due to the fact that head room is conserved, it is, nevertheless, obvious that the principles of the present invention may be used in a horizontal machine. It is further obvious that the expense of manufacture is greatly reduced due to the use of a single cylinder for actuating the movable die plate and the injection plunger simultaneously, thus eliminating many of the parts now necessary on standard machines. The use of the novel cam arrangement in conjunction with the toggle is a simple and rugged arrangement for building up and maintaining the necessary die closing pressure.

Various other changes may be made without departing from the spirit of the invention and all of such changes are contemplated as may come within the scope of the claims.

What I claim is:

1. In a machine for molding plastics or other moldable material, a supporting frame, a first plate carried by said frame for supporting part of a die, a second plate movably carried by said frame for supporting the other part of the die, toggle joint mechanism connecting said movable die plate to the frame, a cylinder carried by the frame and having a fluid pressure operated piston therein and having a piston rod projecting from the cylinder, a heating cylinder carried by said movable die plate having a chamber for receiving plastic material and having a nozzle portion for directing plastic material in plasticized condition into the die, an injection plunger connected to said piston rod and movable into and out of said heating cylinder, and connecting means between said piston rod and toggle joint mechanism for causing opening and closing movement of the movable die plate in response to movement of the piston rod, said connecting means including means for building up and maintaining a die closing pressure while the injection plunger finishes its forward stroke.

2. In a machine for molding plastics or other moldable material, a supporting frame, a first plate carried by said frame for supporting part of a die, a second plate movably carried by said frame for supporting the other part of the die, toggle joint mechanism connecting said movable die plate to the frame, means operable on said toggle joint mechanism for causing opening and closing movement of the movable die plate, said last means including cam mechanism for building up and maintaining a die closing pressure, a heating cylinder carried by said movable die plate and having a chamber for receiving plastic material and having a nozzle portion for directing plastic material in plasticized condition into the die, and an injection plunger operable by said toggle joint operating means and movable into said heating cylinder while said cam mechanism is maintaining die closing pressure.

3. In a machine for molding plastics or other moldable material, a supporting frame, a first plate carried by said frame for supporting part of a die, a second plate movably carried by said frame for supporting the other part of the die, spaced toggle joints each having one end pivotally connected to the frame and each having its other end pivotally connected to the movable die plate, a movable toggle head, a heating cylinder carried by said movable die plate and having a chamber for receiving plastic material and having a nozzle portion for directing plastic material in plasticized condition into the die, an injection plunger movable with said toggle head, a connecting link pivoted at one end to one side of said head and at its other end to the knee of the toggle joint on one side, a second connecting link pivoted at one end to the other side of said toggle head and at its other end to the knee of the other toggle joint, means for forcibly moving said toggle head to cause movement of the movable die plate toward and away from the first-mentioned die plate, and means including cooperable cam shaped ends on the connecting links for building up and maintaining a die closing pressure while the injection plunger finishes its forward stroke.

4. In a machine for molding plastics or other moldable material, a supporting frame, a first plate carried by said frame for supporting part of a die, a second plate movably carried by said frame for supporting the other part of the die, spaced toggle joints each having one end pivotally connected to the frame and each having its other end pivotally connected to the movable die plate, a movable toggle head, a heating cylinder carried by said movable die plate and having a chamber for receiving plastic material and having a nozzle portion for directing plastic material in plasticized condition into the die, an injection plunger movable with said toggle head, a connecting link pivoted at one end to one side of said head and at its other end to the knee of the toggle joint on one side, a second connecting link pivoted at one end to the other side of said toggle head and at its other end to the knee of the other toggle joint, a cylinder carried by the frame and having a fluid pressure operated piston therein and having a piston rod projecting from the cylinder and connected to said toggle head to cause movement of the movable die plate toward and away from the first-mentioned die plate, and means including cooperable cam shaped ends on the connecting links for building up and maintaining a die closing pressure while the injection plunger continues its forward stroke.

5. In a machine for molding plastics or other moldable material, a supporting frame, a first plate carried by said frame for supporting part of a die, a second plate movably carried by said frame for supporting the other part of the die, toggle joint mechanism connecting said movable die plate to the frame, a cylinder carried by the frame and having a fluid pressure operated piston therein and having a piston rod projecting from the cylinder, a cylinder having a chamber for receiving moldable material movable with said movable die plate, said last-mentioned cylinder having a bottom opening for directing the moldable material into a die, an injection plunger connected to said piston rod and movable into and out of said last mentioned cylinder, and connecting means between said piston rod and toggle joint mechanism for causing opening and closing movement of the movable die plate in response to movement of the piston rod, said connecting means including means for building up and maintaining a die closing pressure while the injection plunger finishes its forward stroke.

6. In a machine for molding plastics or other moldable material, a supporting frame, a first plate carried by said frame for supporting part of a die, a second plate movably carried by said frame for supporting the other part of the die, toggle joint mechanism connecting said movable die plate to the frame, means operable on said toggle joint mechanism for causing opening and closing movement of the movable die plate, said last means including cam mechanism for building up and maintaining a die closing pressure, a cylinder having a chamber for receiving moldable material movable with said movable die plate, said cylinder having a bottom opening for directing the moldable material into a die, and an injection plunger operable by said toggle joint operating means and movable into said cylinder while said cam mechanism is maintaining die closing pressure.

7. In a machine for molding plastics or other moldable material, a supporting frame, a first plate carried by said frame for supporting part of a die, a second plate movably carried by said frame for supporting the other part of the die, spaced toggle joints each having one end pivotally connected to the frame and each having its other end pivotally connected to the movable die plate, a movable toggle head, a cylinder having a chamber for receiving moldable material movable with said movable die plate, said cylinder having a bottom opening for directing the moldable material into a die, an injection plunger movable with said toggle head, a connecting link pivoted at one end to one side of said head and at its other end to the knee of the toggle joint on one side, a second connecting link pivoted at one end to the other side of said toggle head and at its other end to the knee of the other toggle joint, means for forcibly moving said toggle head to cause movement of the movable die plate toward and away from the first-mentioned die plate, and means including cooperable cam shaped ends on the connecting links for building up and maintaining a die closing pressure while the injection plunger finishes its forward stroke.

8. In a machine for molding plastics or other moldable material, a supporting frame, a first plate carried by said frame for supporting part of a die, a second plate movably carried by said frame for supporting the other part of the die, spaced toggle joints each having one end pivotally connected to the frame and each having its other end pivotally connected to the movable die plate, a movable toggle head, a cylinder having a chamber for receiving moldable material movable with said movable die plate, said cylinder having a bottom opening for directing the moldable material into a die, an injection plunger movable with said toggle head, a connecting link pivoted at one end to one side of said head and at its other end to the knee of the toggle joint on one side, a second connecting link pivoted at one end to the other side of said toggle head and at its other end to the knee of the other toggle joint, a cylinder carried by the frame and having a fluid pressure operated piston therein and having a piston rod projecting from the cylinder and connected to said toggle head to cause movement of the movable die plate toward and away from the first-mentioned die plate, and means including cooperable cam shaped ends on the connecting links for building up and maintaining a die closing pressure while the injection plunger continues its forward stroke.

9. In a machine for molding plastics or other moldable material, a supporting frame, a first plate carried by said frame for supporting part of a die, a second plate movably carried by said frame for supporting the other part of the die, toggle joint mechanism connecting said movable die plate to the frame, means operable on said toggle joint mechanism for causing opening and closing movement of the movable die plate, said last means including cam mechanism for building up and maintaining a die closing pressure, a member having a chamber for receiving moldable material movable in the same direction as said movable die plate, said member having a discharge opening for directing the moldable material into a die, and an injection plunger operable by said toggle joint operating means and movable into said receiving member while said cam mechanism is maintaining die closing pressure.

10. In a machine for molding plastics or other moldable material, a supporting frame, a first plate carried by said frame for supporting part of a die, a second plate movably carried by said frame for supporting the other part of the die, spaced toggle joints each having one end pivotally connected to the frame and each having its other end pivotally connected to the movable die plate, a movable toggle head, a member having a chamber for receiving moldable material movable in the same direction as said movable die plate, said member having a discharge opening for directing the moldable material into a die, an injection plunger movable with said toggle head, a connecting link pivoted at one end to one side of said head and at its other end to the knee of the toggle joint on one side, a second connecting link pivoted at one end to the other side of said toggle head and at its other end to the knee of the other toggle joint, means for forcibly moving said toggle head to cause movement of the movable die plate toward and away from the first-mentioned die plate, and means including cooperable cam shaped ends on the connecting links for building up and maintaining a die closing pressure while the injection plunger finishes its forward stroke.

11. In a machine for molding plastics or other moldable material, a supporting frame, a first plate carried by said frame for supporting part of a die, a second plate movably carried by said frame for supporting the other part of the die, spaced toggle joints each having one end pivotally connected to the frame and each having its other end pivotally connected to the movable die plate, a movable toggle head, a member having a chamber for receiving moldable material movable with said movable die plate, said member having a discharge opening for directing the moldable material into a die, an injection plunger movable with said toggle head, a connecting link pivoted at one end to one side of said head and at its other end to the knee of the toggle joint on one side, a second connecting link pivoted at one end to the other side of said toggle head and at its other end to the knee of the other toggle joint, a cylinder carried by the frame and having a fluid pressure operated piston therein and having a piston rod projecting from the cylinder and connected to said toggle head to cause movement of the movable die plate toward and away from the first-mentioned die plate, and means including cooperable cam shaped ends on the connecting links for building up and maintaining a die closing pressure while the injection plunger continues its forward stroke.

12. In a machine for molding plastics or other moldable material, a supporting frame, a first plate carried by said frame for supporting part of a die, a second plate movably carried by said frame for supporting the other part of the die, spaced toggle joints each having one end pivotally connected to the frame and each having its other end pivotally connected to the movable die plate, a movable toggle head, a member having a chamber for receiving moldable material movable in the same direction as said movable die plate, said member having a discharge opening for directing the moldable material into a die, an injection plunger movable with said toggle head, a connecting link having a pivotal connection at one end to one side of said head and being pivoted at its other end to the knee of the toggle joint on one side, a second connecting link having a pivotal connection at one end to the other side of said toggle head and being pivoted at its other end to the knee of the other toggle joint, means for forcibly moving said toggle head to cause movement of the movable die plate toward and away from the first-mentioned die plate, said connecting links having adjacent cam shaped ends located inwardly of said pivotal connections and adapted for direct rocking engagement with each other, said pivotal connections permitting a relative lateral floating movement of said links in relation to said head.

WILLIAM S. RENIER.

REFERENCES CITED

The following references are of record in the file of this patent:

UNITED STATES PATENTS

| Number | Name | Date |
| --- | --- | --- |
| 2,269,388 | Weida | Jan. 6, 1942 |
| 2,297,474 | Hempel | Sept. 29, 1942 |
| 945,550 | Klocke | Jan. 4, 1910 |